(12) United States Patent
Kawahara et al.

(10) Patent No.: US 12,304,999 B2
(45) Date of Patent: May 20, 2025

(54) METHOD FOR PURIFYING POLYETHYLENE GLYCOL COMPOUND

(71) Applicant: NOF CORPORATION, Tokyo (JP)

(72) Inventors: Ryo Kawahara, Kawasaki (JP); Atsushi Sato, Kawasaki (JP); Midori Hirai, Kawasaki (JP); Kyu Takeuchi, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 484 days.

(21) Appl. No.: 17/788,618

(22) PCT Filed: Dec. 21, 2020

(86) PCT No.: PCT/JP2020/047604
§ 371 (c)(1),
(2) Date: Jun. 23, 2022

(87) PCT Pub. No.: WO2021/132124
PCT Pub. Date: Jul. 1, 2021

(65) Prior Publication Data
US 2023/0050758 A1    Feb. 16, 2023

(30) Foreign Application Priority Data

Dec. 27, 2019 (JP) .................................. 2019-237880

(51) Int. Cl.
C08G 65/30     (2006.01)
C08G 65/325    (2006.01)

(52) U.S. Cl.
CPC .......... *C08G 65/30* (2013.01); *C08G 65/325* (2013.01); *Y02P 20/55* (2015.11)

(58) Field of Classification Search
CPC ........ C08G 65/30; C08G 65/325; Y02P 20/55
See application file for complete search history.

(56) References Cited

U.S. PATENT DOCUMENTS

| | | | |
|---|---|---|---|
| 8,163,869 B1 | 4/2012 | Yoshimura et al. | |
| 9,458,292 B2 * | 10/2016 | Yoshioka | C08G 65/30 |
| 10,752,732 B2 * | 8/2020 | Hirai | C08G 65/46 |
| 2002/0165205 A1 | 11/2002 | Kubo et al. | |
| 2005/0058620 A1 | 3/2005 | Nakamoto et al. | |
| 2005/0288490 A1 | 12/2005 | Nakamoto et al. | |
| 2006/0073113 A1 | 4/2006 | Nakamoto et al. | |
| 2006/0115450 A1 | 6/2006 | Nakamoto et al. | |
| 2009/0192320 A1 | 7/2009 | Nakamoto et al. | |
| 2010/0256325 A1 | 10/2010 | Yoshioka et al. | |
| 2010/0286361 A1 | 11/2010 | Yoshimura et al. | |
| 2011/0082277 A1 | 4/2011 | Nakamoto et al. | |
| 2016/0046762 A1 | 2/2016 | Yoshioka et al. | |

FOREIGN PATENT DOCUMENTS

| | | |
|---|---|---|
| CN | 103270084 A | 8/2013 |
| EP | 2 657 272 A1 | 10/2013 |
| EP | 3 053 944 A1 | 8/2016 |
| JP | 8-165343 A | 6/1996 |
| JP | 2002-363278 A | 12/2002 |
| JP | 2004-197077 A | 7/2004 |
| JP | 2010-248504 A | 11/2010 |
| JP | 2010-254978 A | 11/2010 |
| JP | 2011-79934 A | 4/2011 |
| JP | 2014-208786 A | 11/2014 |
| WO | 96/21469 A1 | 7/1996 |
| WO | 2012/086016 A1 | 6/2012 |

OTHER PUBLICATIONS

Communication issued on Jan. 16, 2024 by the European Patent Office for European Patent Application No. 20906848.5.
International Search Report (PCT/ISA/210) dated Feb. 22, 2021, issued by the International Searching Authority in counterpart International Application No. PCT/JP2020/047604.
Written Opinion (PCT/ISA/237) dated Feb. 22, 2021, issued by the International Searching Authority in counterpart International Application No. PCT/JP2020/047604.
Office Action dated Sep. 14, 2023, issued by Chinese Patent Office in Chinese Patent Application No. 202080090741.7.
Communication dated Dec. 20, 2024, issued by the Korean Patent Office in Korean Application No. 10-2022-7021637.
Communication dated Dec. 5, 2024, issued by the Japanese Patent Office in Japanese Application No. 2020-210998.

* cited by examiner

*Primary Examiner* — Rabon A Sergent
(74) *Attorney, Agent, or Firm* — Sughrue Mion, PLLC

(57) ABSTRACT

A method for purifying a polyethylene glycol compound represented by formula [1], including a Step (A) of dissolving the compound represented by formula [1] in an organic solvent having a Hildebrand solubility parameter of 8 to 10 $(cal/cm^3)^{1/2}$ to obtain a solution, and a Step (B) of mixing the solution with 0.1 to 1 part by mass of an adsorbent made from a hydrotalcite having a specific surface area of 50 to 200 $m^2/g$ with respect to 1 part by mass of the compound of the formula [1] to prepare a slurry,

[1]

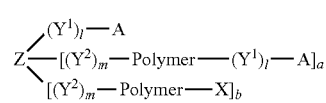

where Z, $Y^1$, $Y^2$, A, Polymer, X, a, b, l and m are as defined herein.

2 Claims, 2 Drawing Sheets

METHOD FOR PURIFYING POLYETHYLENE GLYCOL COMPOUND

CROSS-REFERENCE TO RELATED APPLICATIONS

This application is a National Phase Entry of PCT International Application No. PCT/JP2020/047604, filed on Dec. 21, 2020, which claims priority to Japanese Patent Application No. 2019-237880, filed on Dec. 27, 2019 incorporated herein by reference in its entirety.

TECHNICAL FIELD

The present invention relates to a method for purifying a polyethylene glycol compound having one amino group, which is preferably used in pharmaceutical uses. More specifically, the invention is a purification method for obtaining a high-purity polyethylene glycol compound having one amino group that is a high-molecular-weight activated polyethylene glycol for chemical modification in a drug delivery system and is used as a raw material thereof.

The present invention is particularly suitable for pharmaceutical uses including modification of polypeptides, enzymes, antibodies, other low-molecular drugs, nucleic acid compounds such as genes and oligonucleic acids, nucleic acid medicaments, and other physiologically active substances or application to drug delivery system carriers such as liposomes, polymer micelles, and nanoparticles.

BACKGROUND ART

A polyethylene glycol (PEG) is widely known as a standard carrier in a drug delivery system and is a very useful and indispensable material. By modifying a drug such as a physiologically active substance or a liposome with a polyethylene glycol compound, capture of the drug by the reticular endothelial system (RES) and excretion thereof in the kidneys are suppressed due to the high hydration layer and the steric repulsion effect of the polyethylene glycol, so that it becomes possible to improve the circulation in blood of the drug and reduce the antigenicity thereof. Especially, a polyethylene glycol compound having an amino group at the terminal itself is a modifying agent for a drug having a carboxyl group, and also is used as a raw material for synthesizing other activated polyethylene glycol compounds such as terminal maleimide compounds, azide compounds, and iodoacetamide compounds by the reaction with a low-molecular activating reagent or as a raw material of a block copolymer for forming a polymer micelle by the reaction with an α-amino acid-N-carboxy anhydride, so that the polyethylene glycol compound is particularly an important material.

As such an activated polyethylene glycol compound for the purpose of pharmaceutical uses, one containing little impurities is required from the viewpoint of the performance and safety of a drug produced by modifying the activated polyethylene glycol compound. Currently, as the polyethylene glycol compounds having one amino group at the terminal, those having various backbones have been developed, and impurities produced as by-products vary depending on the production method thereof. In the case where a polyethylene glycol compound having a plurality of amino groups is contained as an impurity, it causes oligomerization of a drug when the drug is modified, so that it is preferable to reduce the amount as much as possible. However, since the polyethylene glycol compound having one amino group and the polyethylene glycol compound having a plurality of amino groups as an impurity are both polymers and have ionic amino groups, they have similar physicochemical properties and hence, separation and purification are difficult by means of general technologies.

Patent Literature 1 describes a method for purifying a polyethylene glycol compound having one amino group by column chromatography using an ion exchange resin. In this method, the polyethylene glycol compound can be separated and purified according to the difference in the number of amino groups by continuously changing the composition of an eluent. However, since such a purification method using an ion exchange resin is a method utilizing an interaction with a solid surface and an adsorption phenomenon thereon in principle, a purification treatment using a large amount of the resin is required under dilute solution conditions. Since the concentration of the polyethylene glycol compound in the process should be a dilution condition of about 1 to 2% in order to suppress a decrease in the separability, industrial productivity cannot be sufficiently satisfied. In addition, a large amount of the ion exchange resin is finally turned into waste, and thus the method is a purification method that has a problem also in industrial use.

Patent Literature 2 describes a method for purification by dissolving a polyethylene glycol compound having one amino group in a strongly acidic aqueous solution having a pH of 1 to 3 to ionize the terminal amino group and extracting the polyethylene glycol compound in a specific temperature range using a specific mixed organic solvent. In this patent, the polyethylene glycol compound having an amino group whose hydrophilicity has been enhanced by ionization is distributed to the aqueous layer, and the polyethylene glycol compound having no amino group is distributed to the mixed organic layer, so that they can be selectively separated and purified. However, since this purification method separates the polyethylene glycol compounds depending on the presence or absence of an amino group, when both the target substance and an impurity contain one or more amino groups, the both cannot be separated depending on the difference in the number of amino groups.

Patent Literatures 3 and 4 describe a method for purifying a polyethylene glycol compound by utilizing the interaction between a polyethylene glycol compound having a hydroxyl group and a carboxyl group and an adsorbent. When an appropriate adsorbent that interacts with these functional groups is used, a polyethylene glycol having a larger number of the functional groups is preferentially adsorbed on the adsorbent, so that separation and purification can be achieved depending on the presence or absence of the functional group and, in some cases, the number of the functional groups. However, there is no description that an impurity can be selectively removed depending on the presence or absence of an amino group and the number of the amino groups.

PRIOR ART DOCUMENTS

Patent Literature

Patent Literature 1: JP-A-8-165343
Patent Literature 2: JP-A-2014-208786
Patent Literature 3: JP-A-2010-254978
Patent Literature 4: JP-A-2011-79934

SUMMARY OF INVENTION

Problem to be Solved by Invention

As described above, although a polyethylene glycol compound having one amino group at the terminal is an important material in pharmaceutical uses, the compound has not been obtained by an industrially easy production method and there exist many problems.

An object of the present invention is to reduce a polyfunctional compound which is an impurity from the main component, and to purify a polyethylene glycol compound having one amino group at the terminal with high efficiency and good purity by an industrially practicable method.

Means for Solving the Problem

As a result of extensive studies to solve the above problems, the present inventors have found that an adsorbent made from a hydrotalcite has an effect of selectively adsorbing and removing a polyethylene glycol compound having a plurality of amino groups that are basic, and attained the present invention.

That is, the present invention is as shown below.

A method for purifying a polyethylene glycol compound represented by the formula [1], comprising the following steps (A) and (B):

Step (A): a step of dissolving the compound represented by the formula [1] in an organic solvent having a Hildebrand solubility parameter of 8 to 10 $(cal/cm^3)^{1/2}$ to obtain a solution, Step (B): a step of mixing the solution with 0.1 to 1 part by mass of an adsorbent made from a hydrotalcite having a specific surface area of 50 to 200 $m^2/g$ with respect to 1 part by mass of the compound of the formula [1] to prepare a slurry,

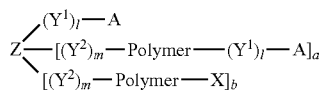

[1]

(in the formula [1],

Z is a residue obtained by removing, from a compound having 2 to 5 active hydrogen groups, the active hydrogen groups;

A is an amino group;

$Y^1$ and $Y^2$ are each independently an ether bond, an amide bond, an ester bond, a urethane bond, a carbonate bond, a secondary amino group, a thioether bond, a disulfide bond, a thioester bond, or an alkylene group containing these;

Polymer represents a polyethylene glycol chain;

X represents a hydrocarbon group having 1 to 7 carbon atoms, an acetal group having 3 to 9 carbon atoms, a hydroxyl group, a protecting group of a hydroxyl group, a carboxyl group, a protecting group of a carboxyl group, a thiol group, a protecting group of a thiol group, a cyano group, or an alkylene group containing these;

l and m respectively satisfy l=1 or 0, and m=1 or 0; and a and b are integers satisfying 0≤a≤4, 0≤b≤4, and 1≤a+b≤4).

Effects of Invention

According to the present invention, it is possible to selectively remove a polyethylene glycol having a plurality of amino groups, which is an impurity, by allowing an adsorbent made from a hydrotalcite to act on a polyethylene glycol compound having one amino group at the terminal. Therefore, the production method of the present invention can easily provide a high-quality polyethylene glycol compound suitable for pharmaceutical uses, on an industrial scale.

EMBODIMENTS FOR CARRYING OUT INVENTION

Figure 1:
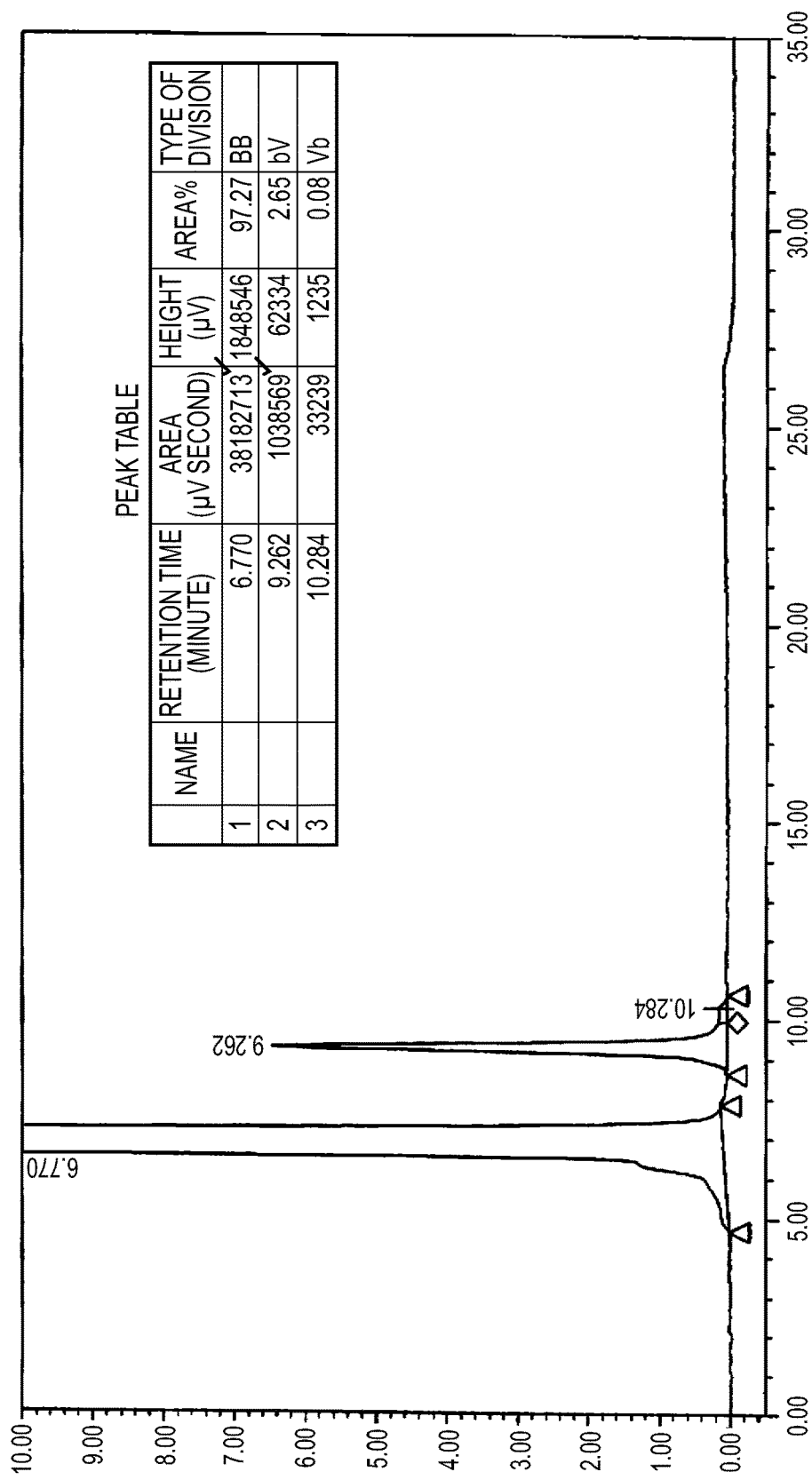
FIG. 1 shows an HPLC chromatogram of the raw material (before purification) of Example 1-1.
Figure 2:
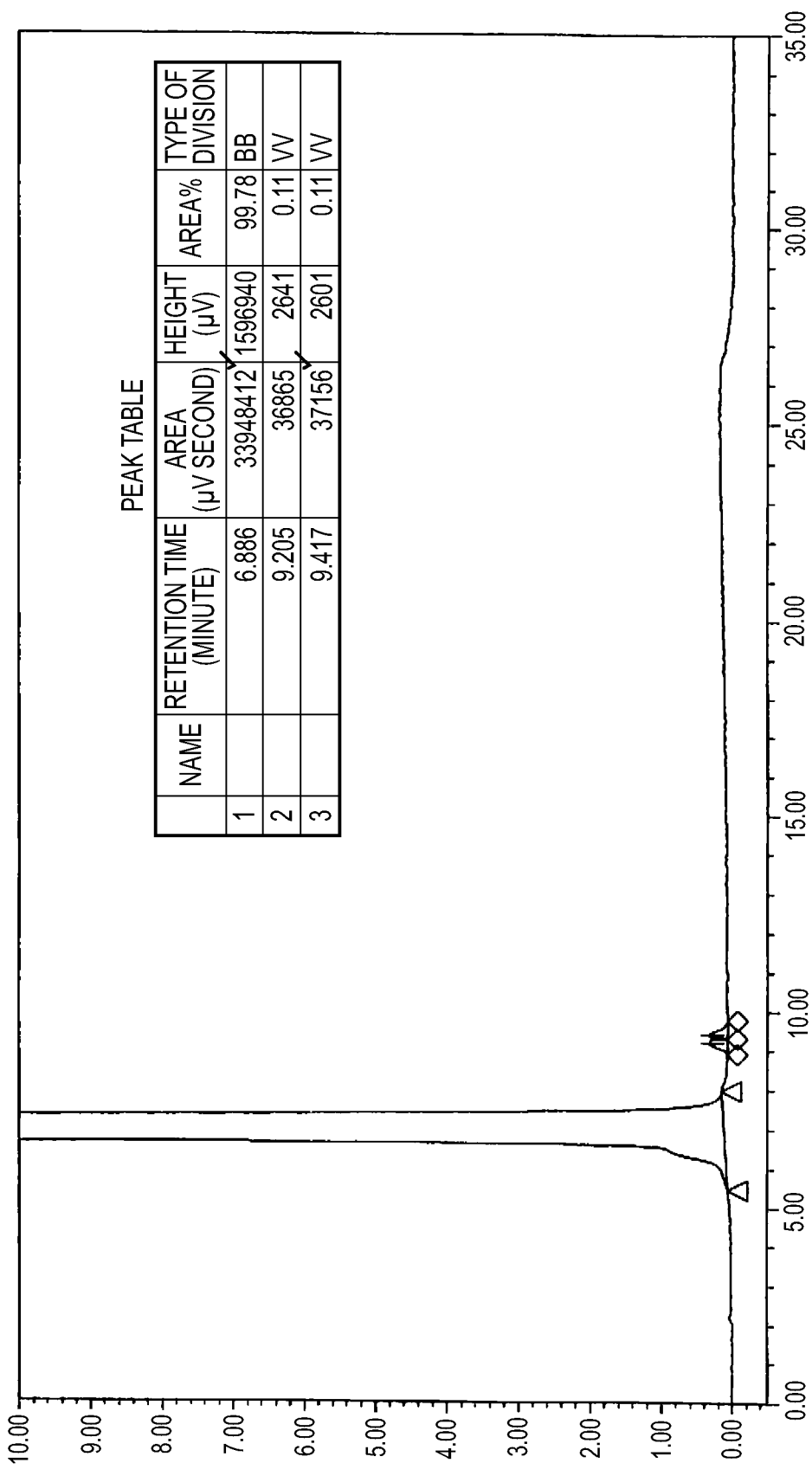
FIG. 2 shows an HPLC chromatogram of Example 1-1 after purification.

The present invention is specifically a method for purifying a polyethylene glycol compound having one amino group represented by the general formula [1] by a treatment step including the following operations.

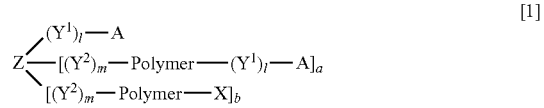

[1]

Z is a residue obtained by removing, from a compound (Z(GH)n: n=2 to 5) having 2 to 5 active hydrogen groups (-GH), the active hydrogen groups. The active hydrogen group means a functional group having active hydrogen. Examples of the active hydrogen group include a hydroxyl group, a carboxyl group, an amino group, a secondary amino group, and a thiol group. When the active hydrogen group (GH) is a hydroxyl group or a carboxyl group, the residue Z is a hydroxyl group-removed residue, and when the active hydrogen group is an amino group, a secondary amino group or a thiol group, the residue Z is a hydrogen-removed residue.

Specific examples of the compound (Z(GH)n: n=2 to 5) having 2 to 5 active hydrogen groups (-GH) include polyhydric alcohols such as ethylene glycol, propylene glycol, trimethylene glycol, isopropylene glycol, butylene glycol, tetramethylene glycol, trimethylolpropane, glycerin, diglycerin, triglycerin, pentaerythritol, and xylitol, or amino acids and peptides having an amino group, a carboxyl group or a thiol group, such as lysine and glutamic acid, and compounds such as organic amines and organic carboxylic acids.

$Y^1$ is a bonding group between the residue Z and A, and is not particularly limited as long as it is a covalent bond. $Y^1$ and $Y^2$ are each independently an ether bond, an amide bond, an ester bond, a urethane bond, a carbonate bond, secondary amino group, a thioether bond, a disulfide bond, a thioester bond, or an alkylene group which may contain these. As the alkylene group portion, there may be preferably mentioned a methylene group, an ethylene group, a propylene group, an isopropylene group, a butylene group, an isobutylene group, a pentylene group, an isopentylene group, a hexylene group, and the like, and they may be branched.

A represents an amino group.

Polymer is a linear or branched polyethylene glycol chain. The branched polyethylene glycol chain is a polyethylene glycol chain that is branched into two or more chains via a linker in the middle, and may have a plurality of branching points. An example is a polyethylene glycol chain having a polyhydric alcohol such as glycerin as a branching point and branching into two or more chains, as shown in the following formula (i).

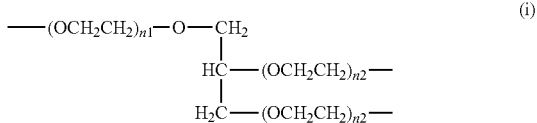

(i)

(wherein n1 and n2 are each 1 to 1,000, preferably 100 to 1,000.)

The weight-average molecular weight of the polyethylene glycol compound is not particularly limited, but is preferably 2,000 to 100,000, and more preferably 2,000 to 80,000.

l equals 0 or 1, m equals 0 or 1, and a and b are integers satisfying $0 \le a \le 4$, $0 \le b \le 4$, and $1 \le a+b \le 4$.

Hereinafter, each step will be described in more detail.

The step (A) is a step of dissolving the compound represented by the formula [1] in an organic solvent having a Hildebrand solubility parameter of 8 to 10 $(\text{cal/cm}^3)^{1/2}$ to obtain a solution.

In the step (A), an organic solvent having a Hildebrand solubility parameter of 8 to 10 $(\text{cal/cm}^3)^{1/2}$ is used. When the Hildebrand solubility parameter of this organic solvent is less than 8, the polyethylene glycol compound will not dissolve, and when it exceeds 10, there is a risk of desorption and elution of metal components from the adsorbent, so that the cases are not preferable. The Hildebrand solubility parameter of the organic solvent is preferably 8.5 to 9.5, and more preferably 8.5 to 9.0. The organic solvent is preferably an organic solvent selected from toluene, xylene, benzene, chloroform and dichloromethane, more preferably toluene or chloroform, and even more preferably toluene.

In the step (A), when the amount of the organic solvent with respect to 1 part by mass of the compound of the formula [1] is expressed as W and the weight-average molecular weight of the compound represented by the formula [1] is expressed as M, it is preferable to satisfy $2.0 M \times 10^{-4} + 2.0 \le W \le 50$, and more preferable to satisfy $2.0 M \times 10^{-4} + 2.0 \le W \le 30$.

The polyethylene glycol compound is dissolved using the above organic solvent. With regard to the order of charging into the treatment vessel, either the polyethylene glycol compound or the organic solvent may be first charged. Heating may be required depending on the molecular weight of the polyethylene glycol compound, and the method for heating is not particularly limited, but in general, the compound can be dissolved by heating to 30° C. or higher.

The step (B) is a step of mixing the solution with 0.1 to 1 part by mass of an adsorbent made from a hydrotalcite having a specific surface area of 50 to 200 m²/g with respect to 1 part by mass of the compound of the formula [1] to prepare a slurry.

The adsorbent in the step (B) is made from at least one hydrotalcite selected from the group consisting of compounds having the following general formula:

$$(M^{2+})_{1-x^1}(M^{3+})_{x^1}(OH)_2(A^{n-})_{x^1/n} \cdot aH_2O$$

(wherein $M^{2+}$ represents a divalent metal ion, $M^{3+}$ represents a trivalent metal ion, $A^{n-}$ represents an n-valent anion, n represents the valence of the $A^{n-}$ anion, $x^1$ and a represent ranges of $0 < x^1 < 0.5$ and $0 \le a < 1$, respectively);
or $$x^2(M^{2+})O \cdot y(M^{3+})_2O_3 \cdot z(A^{n-}) \cdot bH_2O$$

(wherein $M^{2+}$ represents a divalent metal ion, $M^{3+}$ represents a trivalent metal ion, $A^{n-}$ represents an n-valent anion, n represents the valence of the $A^{n-}$ anion, $x^2$, y, z, and b represent ranges of $0 < x^2 \le 10$, $0 < y \le 10$, $0 \le z \le 10$, and $0 \le b \le 20$, respectively).

As $M^{2+}$, a divalent ion of Mg, Ca or Zn is preferable, as $M^{3+}$, a trivalent ion of Al or Fe is preferable, and as $A^{n-}$, OH, $ClO_4$, $NO_3$, $SO_4$, $CO_3$, $SiO_3$, $HPO_4$, $PO_4$ or $CH_3COO$ may be mentioned. Of these, a hydrotalcite in which $M^{2+}$ is Mg, $M^{3+}$ is Al, and $A^{n-}$ is $CO_3$ is preferable. Particularly preferred is $(Mg)_{1-x^1}(Al)_{x^1}(OH)_2(CO_3)_{x^1/2} \cdot aH_2O$ ($0.2 \le x^1 \le 0.4$, $0.4 \le a \le 0.7$) or $x^2MgO \cdot yAl_2O_3 \cdot z(CO_3) \cdot bH_2O$ ($1 \le x^2 \le 4$, $0.5 \le y \le 3$, $0 \le z \le 3$, $0 \le b \le 10$), and most preferred is $x^2MgO \cdot yAl_2O_3 \cdot z(CO_3) \cdot bH_2O$ ($1 \le x^2 \le 5$, $0.5 \le y \le 3$, $0 \le z \le 3$, $0 \le b \le 10$). As specific examples, the hydrotalcites are available from the market as STABIACE HT series STABIACE HT-1 ($Mg_{0.67}Al_{0.33}(OH)_2(CO_3)_{0.17} \cdot 0.5H_2O$), STABIACE HT-P ($Mg_{0.69}Al_{0.31}(OH)_2(CO_3)_{0.15} \cdot 0.54H_2O$) manufactured by Sakai Chemical Industry Co., Ltd.; Kyoward series Kyoward 300 ($2.5MgO \cdot Al_2O_3 \cdot 0.7CO_3 \cdot aH_2O$, $6 \le a \le 7$), Kyoward 500 ($Mg_{0.75}Al_{0.25}(OH)_2(CO_3)_{0.13} \cdot aH_2O$, $0.50 \le a \le 0.63$), Kyoward 1000 ($Mg_{0.69}Al_{0.31}(OH)_2(CO_3)_{0.15} \cdot aH_2O$, $0.46 \le a \le 0.62$) manufactured by Kyowa Chemical Industry Co., Ltd.; and the like. Of these, Kyoward 300 is preferable. The above adsorbent may be used alone or in combination.

The amount of the adsorbent is preferably in the range of 0.1 to 1.0 part by mass with respect to 1 part by mass of the compound represented by the formula [1]. When the amount of the adsorbent is less than 0.1 parts by mass, a sufficient purification effect cannot be obtained, and when the amount of the adsorbent is more than 1 part by mass, the polyethylene glycol compound remains in the filtered cake when the slurry solution after treatment is filtered, and the yield decreases. More preferably, the amount of the adsorbent is 0.1 to 0.5 parts by mass.

The treatment temperature in the step (B) is preferably 25 to 60° C. At a temperature lower than 25° C., the viscosity of the solution is high and the purification efficiency is deteriorated. Further, since crystals may precipitate depending on the structure and molecular weight of the polyethylene glycol compound, the temperature is preferably 25° C. or higher. A more preferable temperature range is 40 to 60° C.

The treatment time in the step (B) is preferably between 0.1 and 24 hours. Further, the atmosphere in which this operation is performed is not particularly limited, but preferably, for the purpose of minimizing oxidation, the treatment can also be performed in the presence of an inert gas such as nitrogen. Moreover, the apparatus is not particularly limited, but the treatment can also be performed in a pressure-resistant vessel in consideration of the operation under nitrogen and in a closed state where oxidative deterioration is unlikely to occur.

Recovery Step: Step of Recovering the Polyethylene Glycol Compound from the Slurry This step is a step of removing the adsorbent and the solvent from the adsorption treatment solution (slurry) of the step (B) and isolating the target polyethylene glycol compound. The method for removing the adsorbent is not particularly limited, but generally, the adsorbent is removed by filtration under reduced pressure or filtration under pressure. At this time, it is desirable to heat the filter to the same temperature as the treatment temperature in the step (B) previously in order to prevent crystal precipitation owing to a decrease in temperature during filtration. After the filtration, the target polyethylene glycol compound is contained in the filtrate.

The treatment step after the removal of the adsorbent is not particularly limited, but typically the polyethylene glycol compound is crystallized by cooling the solution containing the polyethylene glycol compound or adding a hydrocarbon such as hexane or cyclohexane, a higher alcohol such as isopropanol, or an ether such as diethyl ether or methyl tert-butyl ether as a poor solvent, is separated by filtration, and is then dried, and thus the compound can be isolated. Also, the polyethylene glycol compound can be isolated by removing the solvent through solvent removal to achieve drying and solidification.

EXAMPLES

Hereinafter, the present invention will be described in more detail based on Examples. For quantitative determination of the polyfunctional PEG content in the compounds in Examples, a fluorescent substance was bound to the amino group by derivatization using the analytical method A or B shown below, and then the measurement was performed by RP-HPLC.

Derivatization

Analytical Method A:

Into a 9 mL screw tube were charged 100 mg of a sample, 11.3 mg of succinimidyl 6-[[7-(N,N-dimethylaminosulfonyl)-2,1,3-benzoxadiazol-4-yl]amino]hexanoate, 4 mL of toluene, and 1 mL of acetonitrile, followed by dissolution at 25° C. Thereto was added 5.5 μL of N-methylmolpholine, and the whole was stirred at 25° C. for 1 hour. After the reaction, it was diluted with ethyl acetate and crystallization was performed with hexane. The precipitated crystals were separated by filtration and dried under vacuum, and a sample for analysis was collected.

Analytical Method B:

To 300 mg of 3,5-dinitrobenzoyl chloride (DNB) was added 1.5 mL of tetrahydrofuran, and dissolution was achieved to prepare a DNB solution. Into a 1 mL screw tube were charged 10 mg of a sample and 60 μL of tetrahydrofuran, followed by dissolution at 25° C. Thereto were added 4 μL of pyridine and 36 μl of the DNB solution, and derivatization was carried out at 40° C. for 1 hour. After the derivatization was completed, the mixture was diluted with 0.4 mL of a 0.1% aqueous trifluoroacetic acid solution and filtered to obtain a sample for analysis.

Analytical Method of RP-HPLC

Analytical Method A:

Alliance (Waters) was used as an HPLC system, and the measurement was performed under the following conditions.

Mobile Phase

Mobile phase D: 1 mmol/L hydrochloric acid/acetonitrile (2/1)

Mobile phase A: 1 mmol/L hydrochloric acid/acetonitrile (1/1)

Gradient Conditions

| | |
|---|---|
| 0 minute | Mobile phase D:Mobile phase A = 100:0 |
| 22 minutes | Mobile phase D:Mobile phase A = 0:100 |
| 24 minutes | Mobile phase D:Mobile phase A = 0:100 |
| 26 minutes | Mobile phase D:Mobile phase A = 100:0 |
| 35 minutes | Mobile phase D:Mobile phase A = 100:0 |

Flow rate: 1 ml/min

Column: apHera C4, ϕ4.6 mm, 15 cm (SUPELCO)

Column temperature: 33° C. (when molecular weight is 20,000) or 25° C. (when molecular weight is 40,000)

Detector: Fluorescence detector (ex 384 nm, em 520 nm)

Sample concentration: 1 mg/mL

Injection amount: 50 μl (when the molecular weight is 20,000) or 20 μl (when the molecular weight is 40,000)

Analytical Method B:

Thermo Fisher Ultimate 3000 was used as an HPLC system.

Mobile Phase

Mobile phase A: 0.1% aqueous trifluoroacetic acid solution

Mobile phase B: 0.1% trifluoroacetic acid acetonitrile solution

Gradient Conditions

| | |
|---|---|
| 0 minute | Mobile phase A:Mobile phase B = 70:30 |
| 30 minutes | Mobile phase A:Mobile phase B = 50:50 |
| 30.1 minutes | Mobile phase A:Mobile phase B = 5:95 |
| 35 minutes | Mobile phase A:Mobile phase B = 5:95 |

Flow rate: 0.6 min

Column: Sun Shel HFC 18-30, ϕ3 mm, 15 cm

Column temperature: 50° C.

Detector: UV detector (220 nm)

Sample concentration: 20 mg/mL

Injection amount: 5 μL

For both the analytical methods A and B, as an HPLC measured value, the main peak derived from the target monofunctional compound and the derivatized polyfunctional PEG peak were divided perpendicular to the baseline, and the polyfunctional PEG content was calculated from the obtained area value of each peak by the following formula.

$$\text{Polyfunctional PEG content } [\%] = \Sigma_{q=2}^{a'+b+1}(Q_q/q)/[\Sigma_{q=2}^{a'+b+1}(Q_q/q)+P]\times 100$$

P: peak area of main peak $Q_q$: peak area of derivatized q-functional PEG a', b: integers determined by structure of impurity shown by following formula (ii) or (iii)

In the analytical method A, the impurity represented by the following formula (ii) is detected, and in the analytical method B, the impurity represented by the following formula (iii) is detected.

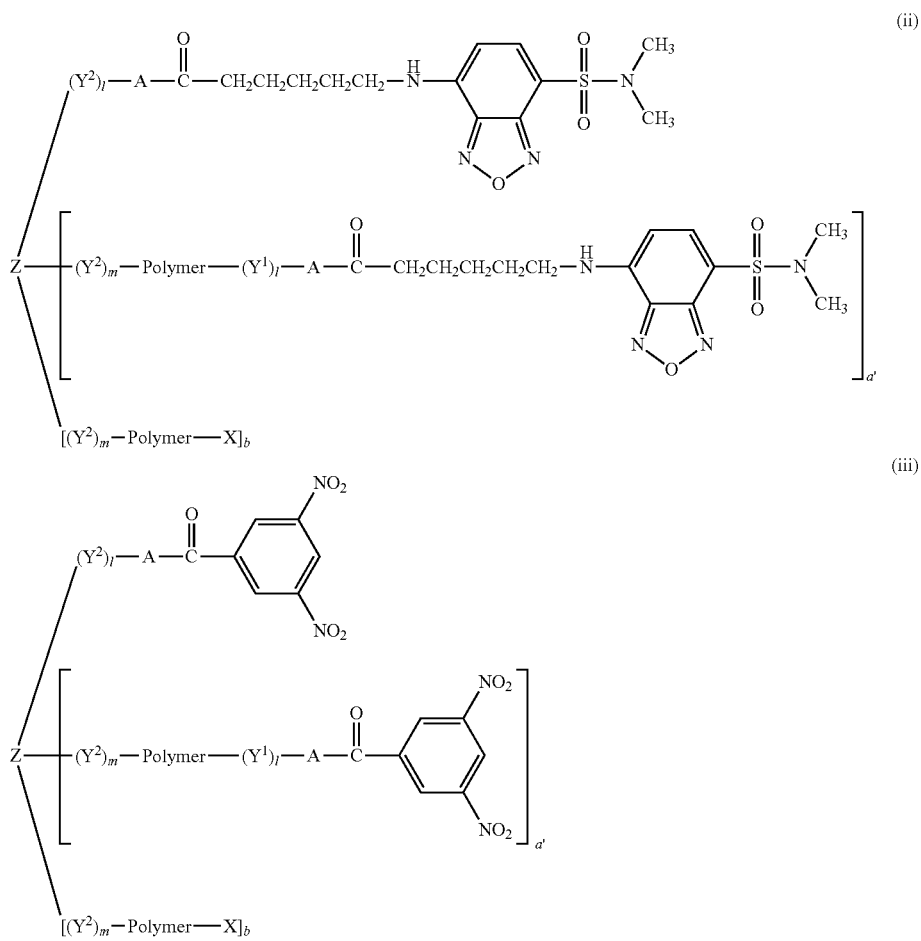

(in the formulae (ii) and (iii),
- Z is a residue obtained by removing, from a compound having 2 to 5 active hydrogen groups, the active hydrogen groups;
- A is an amino group;
- $Y^1$ and $Y^2$ are each independently an ether bond, an amide bond, an ester bond, a urethane bond, a carbonate bond, a secondary amino group, a thioether bond, a disulfide bond, a thioester bond, or an alkylene group containing these;
- Polymer represents a polyethylene glycol chain;
- X represents a hydrocarbon group having 1 to 7 carbon atoms, an acetal group having 3 to 9 carbon atoms, a hydroxyl group, a protecting group of a hydroxyl group, a carboxyl group, a protecting group of a carboxyl group, a thiol group, a protecting group of a thiol group, a cyano group, or an alkylene group containing these;
- l and m respectively satisfy l=1 or 0, and m=1 or 0; and
- a' and b are integers satisfying $1 \leq a' \leq 4$, $0 \leq b \leq 4$, and $1 \leq a' + b \leq 4$).

Example 1-1

Into a 2 L four-necked flask were charged 100 g of a branched polyethylene glycol compound having two polyethylene glycol chains in a glycerin backbone represented by the following formula (iv) (weight-average molecular weight: 20,000, bifunctional PEG content: 1.3%, trifunctional PEG content: not detected) and 1150 g of toluene. A three-one motor, a cooling tube, and a nitrogen blowing tube were attached, and the whole was dissolved at 50° C. using a water bath. Thereto was added 30 g of Kyoward 300 (Kyowa Chemical Industry Co., Ltd.), followed by stirring at 50° C. for 1 hour. Then, the filtrate was collected by filtration, concentrated, and then hexane was added to precipitate crystals. The precipitated crystals were separated by filtration and dried under vacuum, and the crystals were collected (yield 91%).

As a result of RP-HPLC analysis by the analytical method A, the bifunctional PEG content was 0.1%.

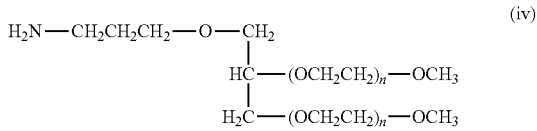

Examples 1-2 to 1-3

Using the same raw materials as in Example 1-1, the same method was performed except that Kyoward 300 was changed to an adsorbent shown in the following table. The results are shown below. In the following table, Kyoward is abbreviated as "KW".

TABLE 1

| | Before purification | Example 1-1 | Example 1-2 | Example 1-3 |
|---|---|---|---|---|
| Adsorbent | — | KW300 | KW500 | KW1000 |
| Specific surface area (m2/g) | — | 130 | 110 | 72 |
| Bifunctional PEG content (%) | 1.3 | 0.1 | 0.2 | 0.1 |
| Yield (%) | — | 91 | 84 | 80 |

From the above results, Kyoward 300, Kyoward 500, and Kyoward 1000, which are hydrotalcites, all had an effect of removing bifunctional PEG. Of these, 300 was the most effective and showed a good yield.

Comparative Examples 1-1 to 1-3

Using the same branched polyethylene glycol compound as in Example 1-1 (weight-average molecular weight: 20,000, bifunctional PEG content: 1.4%, trifunctional PEG content: not detected), the same method was performed except that Kyoward 300 was changed to an inorganic salt shown in the following table. The results are shown below.

TABLE 2

| | Before purification | Comparative Example 1-1 | Comparative Example 1-2 | Comparative Example 1-3 |
|---|---|---|---|---|
| Inorganic salt | — | KW700 | alumina | magnesium sulfate |
| Bifunctional PEG content (%) | 1.4 | 0.1 | 1.4 | 1.3 |
| Yield (%) | — | 40 | 94 | 95 |

From the above results, Kyoward 700, which is aluminum silicate, had an effect of removing the bifunctional PEG because it was an acidic adsorbent, but the yield significantly decreased because the target substance was also adsorbed. On the other hand, an inorganic oxide such as alumina and an inorganic salt such as magnesium sulfate had no purification effect.

Examples 1-4 to 1-5

Using the same raw materials as in Example 1-1, the same method was performed except that the amount of Kyoward 300 was changed to an amount shown in the following table. The results are shown below.

TABLE 3

| | Before purification | Example 1-4 | Example 1-1 | Example 1-5 |
|---|---|---|---|---|
| Amount of adsorbent | — | 0.1 | 0.3 | 0.4 |
| Bifunctional PEG content (%) | 1.3 | 0.3 | 0.1 | 0.1 |
| Yield (%) | — | 91 | 91 | 91 |

From the above results, it was found that the efficiency is slightly lowered but an effect of removing bifunctional PEG was shown even at 0.1 times by mass. In addition, there was almost no decrease in yield in the range of 0.1 to 0.4 times by mass.

Example 2

Into a 500 mL four-necked flask were charged 10 g of a branched polyethylene glycol compound having two polyethylene glycol chains in a glycerin backbone represented by the formula (iv) (weight-average molecular weight: 40,000, bifunctional PEG content: 1.1%, trifunctional PEG content: not detected) and 180 g of toluene. A three-one motor, a cooling tube, and a nitrogen blowing tube were attached, and the whole was dissolved at 50° C. using a water bath. Thereto was added 3 g of Kyoward 300 (Kyowa Chemical Industry Co., Ltd.), followed by stirring at 50° C. for 1 hour. Then, the filtrate was collected by filtration and concentrated, and then hexane was added to precipitate crystals. The precipitated crystals were separated by filtration and dried under vacuum, and the crystals were collected (yield 86%).

As a result of RP-HPLC analysis by the analytical method A, the bifunctional PEG content was less than 0.1% (0.03%).

Example 3

Into a 1 L four-necked flask were charged 20 g of an α-aminopropyl-, ω-methoxy-polyethylene glycol represented by the following formula (v) (molecular weight: 20,000, bifunctional PEG content: 2.8%) and 360 g of toluene. A three-one motor, a cooling tube, and a nitrogen blowing tube were attached, and the whole was dissolved at 50° C. using a water bath. Thereto was added 6 g of Kyoward 300, followed by stirring at 50° C. for 1 hour. Then, the filtrate was collected by filtration and concentrated, and then hexane was added to precipitate crystals. The precipitated crystals were separated by filtration and dried under vacuum, and the crystals were collected (yield 82%).

As a result of RP-HPLC analysis by the analytical method A, the bifunctional PEG content of the sample was 0.5%.

$$CH_3-(OCH_2CH_2)_n-OCH_2CH_2CH_2NH_2 \quad (v)$$

Example 4

Into a 300 mL four-necked flask were charged 10 g of an α-aminopropyl-, ω-methoxy-polyethylene glycol represented by the formula (v) (molecular weight: 2,000, bifunctional PEG content: 1.8%) and 45 g of toluene. A three-one motor, a cooling tube, and a nitrogen blowing tube were attached, and the whole was dissolved at 40° C. under nitrogen using a water bath. Thereto was added 3 g of Kyoward 300, followed by stirring at 40° C. for 30 minutes. Then, the filtrate was collected by filtration and concentrated, and then hexane was added to precipitate crystals. The precipitated crystals were separated by filtration and dried under vacuum, and the crystals were collected (yield 84%).

As a result of RP-HPLC analysis by the analytical method B, the bifunctional PEG content of the sample was 0.9%.

INDUSTRIAL APPLICABILITY

According to the present invention, a high-quality polyethylene glycol compound suitable for pharmaceutical uses can be easily provided on an industrial scale.

While the present invention has been described in detail and with reference to specific embodiments, it will be apparent to one skilled in the art that various changes and modifications can be made therein without departing from the spirit and scope of the invention.

The invention claimed is:

1. A method for purifying a polyethylene glycol compound represented by the formula [1], comprising the following steps (A) and (B):

Step (A): a step of dissolving the compound represented by the formula [1] in an organic solvent having a Hildebrand solubility parameter of 8 to 10 $(cal/cm^3)^{1/2}$ to obtain a solution, Step (B): a step of mixing the solution with 0.1 to 1 part by mass of an adsorbent made from a hydrotalcite having a specific surface area of 50 to 200 $m^2/g$ with respect to 1 part by mass of the compound of the formula [1] to prepare a slurry, and further comprising a step of recovering the polyethylene glycol compound from the slurry to obtain a purified polyethylene glycol compound,

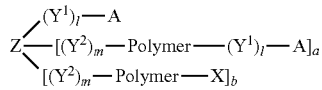

[1]

wherein in the formula [1],

Z is a residue obtained by removing, from a compound having 2 to 5 active hydrogen groups, the active hydrogen groups;

A is an amino group;

$Y^1$ and $Y^2$ are each independently an ether bond, an amide bond, an ester bond, a urethane bond, a carbonate bond, a secondary amino group, a thioether bond, a disulfide bond, a thioester bond, or an alkylene group containing these;

Polymer represents a polyethylene glycol chain;

X represents a hydrocarbon group having 1 to 7 carbon atoms, an acetal group having 3 to 9 carbon atoms, a hydroxyl group, a protecting group of a hydroxyl group, a carboxyl group, a protecting group of a carboxyl group, a thiol group, a protecting group of a thiol group, a cyano group, or an alkylene group containing these;

l and m respectively satisfy l=1 or 0, and m=1 or 0; and a and b are integers satisfying 0≤a≤4, 0≤b≤4, and 1≤a+b≤4.

2. The method according to claim 1, wherein the step of recovering the polyethylene glycol compound from the slurry comprises removing the adsorbent and the solvent from the slurry and isolating the polyethylene glycol compound.

* * * * *